Nov. 12, 1968 W. J. HOLM 3,409,955
APPARATUS FOR CUTTING LOOPS ON THE EDGE OF A RUNNING CLOTH WEB
Filed March 8, 1966 2 Sheets-Sheet 1

INVENTOR.
WILLIAM J. HOLM
BY
Morse, Altman & Oates
ATTORNEYS

Nov. 12, 1968   W. J. HOLM   3,409,955
APPARATUS FOR CUTTING LOOPS ON THE EDGE OF A RUNNING CLOTH WEB
Filed March 8, 1966   2 Sheets-Sheet 2

INVENTOR.
WILLIAM J. HOLM
BY
Morse, Altman & Oates
ATTORNEYS

United States Patent Office 3,409,955
Patented Nov. 12, 1968

3,409,955
APPARATUS FOR CUTTING LOOPS ON THE EDGE OF A RUNNING CLOTH WEB
William J. Holm, Springfield, Vt., assignor to Parks & Woolson Machine Company, Springfield, Vt., a corporation of Vermont
Filed Mar. 8, 1966, Ser. No. 532,632
1 Claim. (Cl. 26—10.4)

ABSTRACT OF THE DISCLOSURE

A rotary cutting wheel mounted adjacent the edge of a moving cloth web cooperates with a fixed knife to cut loops formed along the cloth selvedge. The wheel rotates about an axis parallel to the web edge and generally in the plane thereof. Air jets cause the loops to extend outwardly to be cut and a control system maintains the selvedge and cutting wheel in proper relation.

Figure 1:
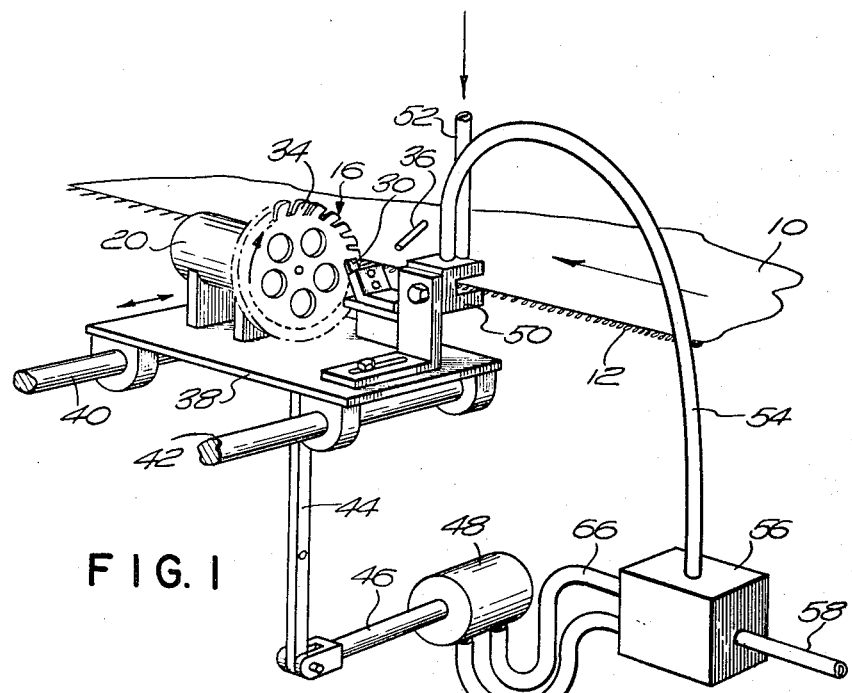

This invention relates generally to textile machinery and more particularly is directed towards a new and improved apparatus for cutting loops formed along the edge of a fabric web.

Many types of fabrics are woven in such a manner that looped threads are formed along one or both edges of the web. Terry loop fabrics, for example, are woven with loops across the width of the web as well as along the edges. These loops normally are trimmed by a shearing machine into a plain or patterned design. In any event the tops of the loops are shorn so that each loop is cut into two pieces each end of which is attached to the fabric.

While conventional cloth shearing machines are effective to shear the loops formed over the width of the fabric, they are relatively ineffective in breaking or trimming the loops which are formed along the edges of the fabric and which lie substantially in the plane of the web.

With most fabrics, it is desirable for various reasons to open the loops during the early stages of the manufacture of the cloth and in some cases to trim the looped edge threads close to the selvedge. For example, in my copending application entitled, "Apparatus for Edge Trimming Fabrics," filed Mar. 8, 1966 under Ser. No. 532,631, there is disclosed a mechanism for trimming the edge fringes close to the cloth edge without damaging the cloth. When edge trimming loops the efficiency of the trimming mechanism may be improved by first opening the loops by breaking or cutting them before they are presented to the shearing elements to be trimmed.

While loop breaking mechanisms have been available heretofore, none of them has proven to be entirely satisfactory for one reason or another. For example, presently available loop breaking devices do not always break all of the loops, or they may pull the loops rather than cut them cleanly and in some instances cause damage to the body of the fabric itself.

Accordingly, it is an object of the present invention to provide improvements in mechanisms for cutting loops along the edge of a fabric.

Another object of this invention is to provide a simple, low-cost and efficient apparatus for cutting thread loops along the edge of a moving fabric web without damage to the fabric.

More particularly this invention features an apparatus for cutting edge loops comprising a power driven rotary cutting wheel formed with a plurality of loop-engaging slots spaced about its periphery. The wheel is mounted for rotation adjacent the cloth selvedge preferably about an axis parallel to the cloth edge and in the plane of the fabric. A fixed knife is mounted adjacent the rotary wheel and in engagement with it whereby loops caught in the slots will be carried against the knife and cut.

In combination with the rotary wheel and fixed knife is a guiding mechanism adapted to maintain the periphery of the wheel and the edge of the fabric in substantially constant closely spaced relation to insure that all of the loops will be cut without damage to the body of the fabric.

Figure 2:
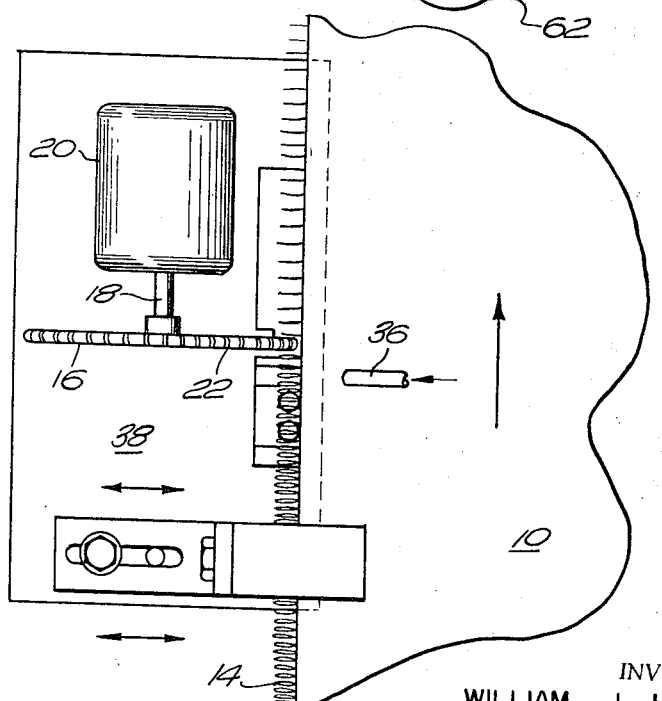
Figure 3:
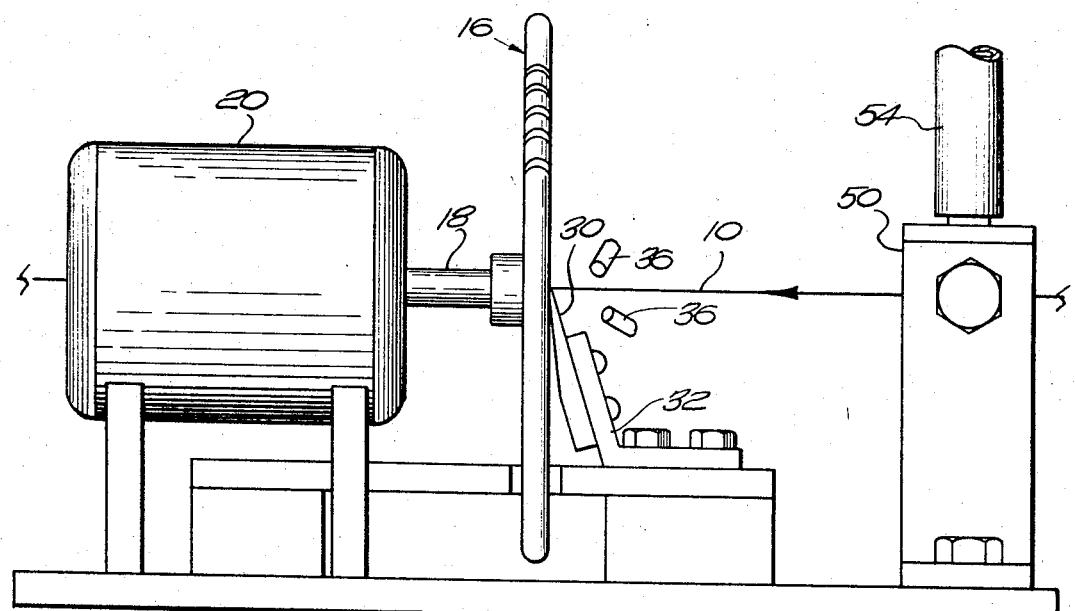
Figure 4:
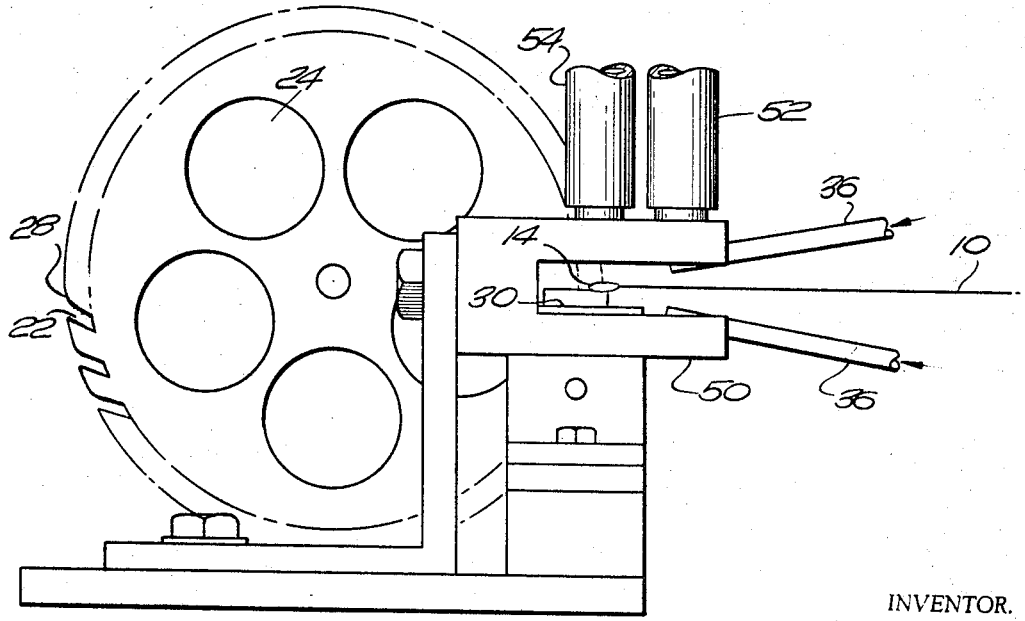

However, these and other features of the invention, along with further objects and advantages thereof, will become more fully apparent from the following detailed description of a preferred embodiment of the invention, with reference being made to the accompanying drawings, in which:

FIG. 1 is a somewhat schematic view in perspective of a loop cutting apparatus made according to the invention, FIG. 2 is a fragmentary top plan view of the apparatus shown in FIG. 1, FIG. 3 is a side elevation thereof, and, FIG. 4 is a front elevation of the loop cutting mechanism.

Referring now to the drawings, the reference character 10 generally indicates a fabric web moving from right to left as viewed in FIG. 1 and formed with a fringe 12 of thread loops 14 along at least one selvedge. Typically, these loops are formed by the weft threads and generally lie in the plane of the web. They may extend out perhaps ½" or 1" or so from the selvedge and normally are relatively light, soft and flexible. In most instances, the presence of these loops is objectionable and it is usually required that they be broken and in some instances trimmed off close to the selvedge. In my copending application above there is disclosed an apparatus for trimming threads formed along the edge of the selvedge. The present invention may be utilized separately or in conjunction with the edge trimmer and in practice would be employed in advance of the edge trimmer in order to cut the loops prior to presenting the edge threads to the shearing mechanism.

The loop cutting apparatus shown in the drawings is generally organized about a rotary loop cutting wheel 16 fixed to a shaft 18 and driven by a motor 20. The wheel is mounted for rotation about an axis substantially in the plane of the cloth and parallel to the selvedge. The wheel is mounted adjacent to the edge which is to have the loops cut with the periphery of the wheel passing through the fringe of loops but slightly spaced from the woven body of the fabric in order to avoid damaging the woven fabric.

The cutting wheel typically is on the order of 8" in diameter, ⅜" thick and is formed with a plurality slots 22 in the rounded edge of the wheel. The slots are evenly spaced about the peripheral edge of the wheel and typically are forty in number. The slots extend chordally into the wheel, each slot being on the order of ⅛" wide by ½" deep set at an angle of 45°. In order to minimize the weight of the wheel and to improve cooling, the wheel may be formed with five 2" diameter holes 24 arranged on a 4" diameter circle.

The entrance of each slot is formed with a slight radius 28 on the leading edge thereof to facilitate catching the loops in the slots as the cutting wheel rotates against the fringe.

Mounted with its cutting edge bearing against the side of the wheel is a thread stripping knife 30 typically having a cutting face of about ¾ of an inch wide spanning the slots 22. The knife itself typically is set at an angle of 17° with respect to the vertical by means of a mounting bracket 32.

It will be understood that as the web 10 advances past the rotary cutting wheel 16, the loops 14 will be caught in the slots 22. The cutter 16, rotating clockwise as viewed in FIG. 1, will pull the loops down against the edge of the knife 30 and thereby cut the individual loops one after another as the web moves along. In order to enhance the cutting action between the knife 30 and the wheel 16 an annular face 34 about the marginal edge of the wheel 16 is ground and polished. It will be understood that this smooth annular face 34 rides against the edge of the fixed knife.

In order to insure that the individual loops are presented in the optimum position to be caught by the slotted wheel, one or more air jet nozzles 36 are mounted above and below the surface of the moving web inboard of the selvedge and directed outwardly towards the loops. Preferably, the nozzles are close to the plane of the cloth and tilted slightly from the parallel as best shown in FIG. 4. In this position the nozzles direct a flow of air out towards the margins causing the fringe of loops to extend straight out from the web uniformly whereby they will be in the optimum position to be caught and cut by the wheel and knife.

Insofar as any moving web tends to shift laterally from side to side as it advances longitudinally, it is necessary to provide means to prevent the cutting wheel and the web edge from drifting too far apart in which case the loops would not be cut or too close together which would cause damage to the body of the fabric. To this end the loop cutting mechanism, including the motor 20, the cutting wheel 16 and the knife 30 are mounted on a carriage 38 for horizontal sliding movement along fixed supports 40 and 42. It will be understood that these supports 40 and 42 will be suitably secured to framework such as the framework of an edge trimming apparatus disclosed in my co-pending application.

In any event, the carriage 38 is drivingly connected by a linkage 44 to a piston rod 46 of a hydraulic cylinder 48. The hydraulic cylinder 48, in turn, is actuated by means of a web edge sensing system including a sensing head 50 mounted on the carriage 38 in advance of the rotary cutter. The head 50 is provided with upper and lower leg portions, the upper being connected to a source of compressed air through a flexible conduit 52. Slot openings are formed on opposing faces of the legs with the air entering the lower leg from the upper leg exhausting through a conduit 54 to a pneumatic-hydraulic relay 56 of the sort sold by North American Manufacturing Company and described more fully in my co-pending application. The relay is connected by a conduit 58 to a source of hydraulic fluid with conduits 60 and 62 leading to opposite ends of the hydraulic cylinder 48. As the pressure in the line 54 varies according to movement of the web edge in and out of the head 50, hydraulic fluid under pressure will be directed to one end or the other of the hydraulic cylinder causing the piston 46 to extend or retract, thereby moving the carriage 38 and its loop cutting mechanism to the right or to the left as required.

In this fashion, the periphery of the cutting wheel and the web edge will be maintained in substantially constant predetermined relation and the loops will move against the cutting elements regardless of variations in the movement of the web. Also, the cutting wheel will be held in spaced relation to the cloth edge at all times, thereby avoiding damage to the body of the cloth which would occur if the cloth and cutting wheel moved into actual contact.

It will be understood that the foregoing loop cutting mechanism is an extremely simple yet highly effective apparatus for efficiently cutting the loops on the edge of a moving web. The loop cutting mechanism may be employed on either or both sides of the web and may be used independently or in conjunction with edge thread shearing mechanisms such as disclosed in my co-pending application. The mechanism provides very high speed loop cutting operations and is capable of operating efficiently up to speeds of 200 yards per minute without damage to the cloth.

While the invention has been described with particular reference to the illustrated embodiment, it will be understood that numerous modifications thereto will appear to those skilled in the art. For example, instead of mounting the loop cutting mechanism for movement to and away from the cloth edge, the cutting elements may be in fixed positions and web guiding mechanism may be employed in conjunction with web edge detecting mechanisms known in the art whereby the web itself will be guided with respect to cutting elements. Accordingly, the above description and accompanying drawings should be taken as illustrative of the invention and not in a limiting sense.

Having thus described the invention, what I claim and desire to obtain by Letters Patent of the United States is:

1. Apparatus for cutting loops formed along an edge of a fabric web, comprising
    (a) a single power driven rotary wheel mounted adjacent the fabric edge, the plane of said web disposed in radial relation to said wheel and perpendicular to the plane of said wheel,
    (b) said wheel being formed with a plurality of peripheral loop-engaging angularly spaced chordal slots,
    (c) said wheel being relatively thin in relation to its diameter, the peripheral edge thereof being rounded and the leading corner at the entrance of each slot being formed with a radius to facilitate engagement of said loops,
    (d) a knife mounted in fixed position to one side of said wheel and formed with a straight cutting edge said knife extending towards said wheel into cooperating cutting relation against the marginal edge thereof in the path of said slots, with said cutting edge in the plane of said web and perpendicular to the web edge,
    (e) outwardly directed air jet means positioned inboard of web edge in proximity to said web edge and adapted to direct said loops outwardly of said web edge, and
    (f) guiding means for maintaining said web edge, said knife and said wheel in constant predetermined relation whereby said loops will be cut by said slots catching said loops and carrying them against said knife as said web is moved past said wheel.

References Cited

UNITED STATES PATENTS

| | | | |
|---|---|---|---|
| 1,815,585 | 7/1931 | Richardson | 26—10.4 |
| 1,973,104 | 9/1934 | Richardson | 26—10.4 |
| 2,099,461 | 11/1937 | Bernstein | 26—10.4 |
| 2,110,567 | 3/1938 | Burr | 26—10.4 |
| 2,477,431 | 7/1949 | Vallenweider | 26—10.4 |

FOREIGN PATENTS 639,078  12/1937  Germany.

OTHER REFERENCES

S. L. Sorsen: 17 Ways to Track the Edge, Control Engineering, May, 1964, pps. 77–80.

ROBERT R. MACKEY, *Primary Examiner.*